United States Patent [19]

Reinmuller

[11] Patent Number: 4,842,045
[45] Date of Patent: Jun. 27, 1989

[54] EXPANDABLE RADIATOR

[75] Inventor: Donald L. Reinmuller, Enon, Ohio

[73] Assignee: The United States of America as represented by the Secretary of the Air Force, Washington, D.C.

[21] Appl. No.: 255,803

[22] Filed: Oct. 11, 1988

[51] Int. Cl.$^4$ .......................... B64G 1/50; F28D 15/02
[52] U.S. Cl. ......................................... 165/41; 165/46; 165/104.26; 244/158 R
[58] Field of Search ...................... 165/41, 104.26, 46, 165/86; 244/158 R, 173

[56] References Cited

U.S. PATENT DOCUMENTS

| | | | |
|---|---|---|---|
| 3,169,379 | 2/1965 | Black | 62/50 |
| 3,417,942 | 12/1968 | Van Alstyne | 244/1 |
| 3,496,995 | 2/1970 | Rosen et al. | 165/46 |
| 3,931,532 | 1/1976 | Byrd | 310/4 |
| 4,212,347 | 7/1980 | Eastman | 165/46 |
| 4,313,492 | 2/1982 | Andros et al. | 165/104.26 |
| 4,402,358 | 9/1983 | Wolf | 165/32 |
| 4,727,932 | 3/1988 | Mahefbey | 165/41 |

Primary Examiner—Albert W. Davis, Jr.
Attorney, Agent, or Firm—Bobby D. Scearce; Donald J. Singer

[57] ABSTRACT

An expandable heat rejection system for radiating heat from a source of heat on a spacecraft or like vehicle is described and comprises a fluid heat exchange medium in operative circulating heat exchange relationship with the source for absorbing heat by evaporation of a liquid phase or the medium, an elongate inflatable sleeve defining an expandable and collapsible volume closed at a first end and including an inlet and outlet at a second end and further defining a condensation surface on the inner surface of the sleeve and a heat radiating surface on the outer surface of the sleeve, a reel attachable to the vehicle and operatively attached to the first end of the sleeve for selectively winding and unwinding the sleeve in response to pressure generated within the system.

6 Claims, 1 Drawing Sheet

EXPANDABLE RADIATOR

RIGHTS OF THE GOVERNMENT

The invention described herein may be manufactured and used by or for the Government of the United States for all governmental purposes without the payment of any royalty.

BACKGROUND OF THE INVENTION

The present invention relates generally to systems for radiating heat from a spacecraft, orbiting vehicle or the like and more particularly to an improved inflatable heat exchange radiator.

Light weight closed loop expandable heat pipe radiator systems having large surface area heat rejection capability of 2-100 megawatts at operating temperatures of 600° K. or higher may be best suited for applications characterized by high (greater than about 5:1) peak to average heat loads of an orbital duty cycle. A radiator system utilizing a two-phase liquid-vapor heat exchange medium takes advantage of the high boiling heat transfer rate of the liquid medium. Representative prior art two-phase systems include those described by or referenced in U.S. Pat. No. 3,496,995 entitled "Furlable Heat Exchanger", U.S. Pat. No. 4,212,347 entitled "Unfurlable Heat Pipe" and U.S. Pat. No. 4,727,932 entitled "Expandable Pulse Power Spacecraft Radiator".

Prior art systems such as those just cited suffer from one or more inadequacies including an undesirably high degree of extension of the expandable radiator in a high heat rejection mode. At peak heat rejection, the radiator and any associated vapor inlet means and radiator extension means may reach 100 meters or more from the orbiting vehicle, which presents a substantial cross section for meteoroid impact and for detection in potentially hostile situations, and which generates a moment about the vehicle resulting in impaired maneuverability for the vehicle.

The invention eliminates or reduces in critical importance deficiencies in prior art systems by providing an expandable radiator system for rejecting high thermal loads from an orbiting vehicle comprising an inflatable radiator for heat ejection by condensation of a vaporizable heat exchange medium, the radiator being compact in a stored condition and presenting minimal extension in an expanded condition. The invention includes an inflatable sleeve presenting surfaces for radiating heat and condensing vaporous heat exchange medium, the sleeve being supported at its distal end in a stored condition coiled on a reel disposed on the vehicle so that only that volume of the sleeve needed momentarily for heat rejection is extended from the vehicle, and any unused sleeve portion remains coiled in the vehicle; this arrangement substantially eliminates the cantilever effect characteristic of prior art systems wherein the unused sleeve portion is carried outwardly from the vehicle with radiator expansion. Vehicle maneuverability is therefore substantially less affected with the system of the invention, and the radiator and vapor inlet is substantially less susceptible to damage from external causes.

It is therefore a principle object of the invention to provide a heat rejection system for an orbiting satellite or like vehicle.

It is another object of the invention to provide a heat rejection system having high peak to average heat rejection capability.

It is a further object of the invention to provide a light weight, non-contaminating, expandable heat radiator having high peak to average heat rejection capability.

It is yet a further object of the invention to provide a heat rejection system for an orbiting vehicle including an expandable radiator having minimal extension in the expanded condition.

These and other objects of the invention will become apparent as the description of representative embodiments proceeds.

SUMMARY OF THE INVENTION

In accordance with the foregoing principles and objects of the invention, an expandable heat rejection system for radiating heat generated by a source of heat on a spacecraft or like vehicle is described and comprises a fluid heat exchange medium in operative circulating heat exchange relationship with the source for absorbing heat by evaporation of a liquid phase of the medium, an elongate inflatable sleeve defining an expandable and collapsible volume closed at a first end and including an inlet and outlet at a second end and further defining a condensation surface on the inner surface of the sleeve and a heat radiating surface on the outer surface of the sleeve, a reel attachable to the vehicle and operatively attached to the first end of the sleeve for selectively winding and unwinding the sleeve in response to pressure generated within the system.

DESCRIPTION OF THE DRAWINGS

The invention will be more clearly understood from the following description of representative embodiments read in conjunction with the accompanying drawings wherein.

DETAILED DESCRITPION

Reference is now made to U.S. Pat. No. 4,727,932 and to FIG. 1 therein presenting a model describing geometry, mass flow and heat transfer principles of an expandable/collapsible control volume illustrative of a two-phase (liquid/vapor) heat transfer system utilizing the characteristic high latent heat of vaporization of a liquid heat exchange medium; details of heat transfer calculations utilizing the model are found in "Low Temperature Expandable Megawatt Pulse Power Radiator", by L. C. Chow, E. T. Mahefkey, and J. E. Yokajty, in Proceedings of the 1985 AIAA Thermophysis Conference (June 19-21, 1985). These teachings are incorporated herein by reference without reiteration.

Figure 1:
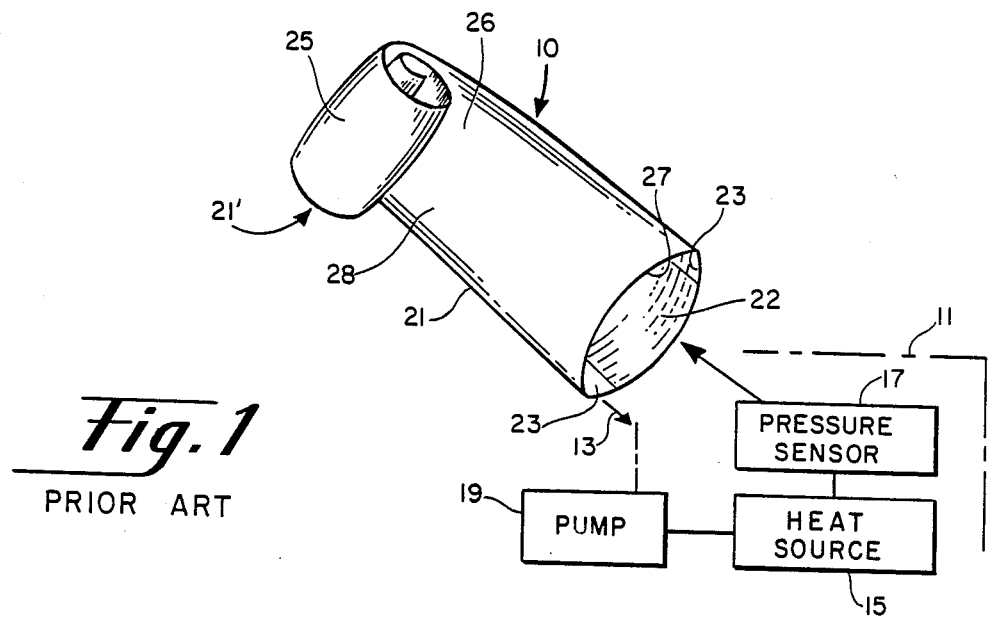
FIG. 1 is a schematic of a two-phase prior art heat transfer system including a furlable radiator sleeve.

Referring now to drawings herein, FIG. 1 schematically illustrates a two-phase liquid-vapor prior art heat transfer system having an expandable/collapsible (furlable) radiator 10. In the operation of any heat rejection system as might be included within an orbiting vehicle 11 (suggested by a broken peripheral line), heat exchange medium 13 may be circulated in heat exchange relationship past a heat source 15 from which it is desirable to reject heat during operation of vehicle 11. Pressure sensor 17 may be operatively connected to radiator 10 and any extension mechanism therefor. Pump 19 (suction, aspiration or other suitable type) circulates heat exchange medium 13 through radiator 10 from heat source 15. Radiator 10 typically includes flexible inflatable sleeve 21 having at least one inlet 22 for admitting heated (vaporous) heat exchange medium 13 conducted from heat exchange relationship with heat source 15, and at least one outlet 23 for circulating cooled (condensed) heat exchange medium 13 toward heat source 15 in a continuous heat rejection scheme. Sleeve 21 is defined by walls 25, 26 of flexible film material defining inner vapor condensation surfaces 27 and outer heat radiating surfaces 28.

In the operation of radiator 10 of the FIG. 1 system, pressure generated by vaporization of heat exchange medium 13 unfurls and expands sleeve 21 to an extended condition, consistent with the pressure level within the system, of preselected design length of 100 meters or more. As sleeve 21 expands and extends, uninflated portion 21' is pushed outwardly from vehicle 11 which, as suggested above, increases the moment arm generated by sleeve 21 and may cause maneuvering difficulty for vehicle 11.

Figure 2:
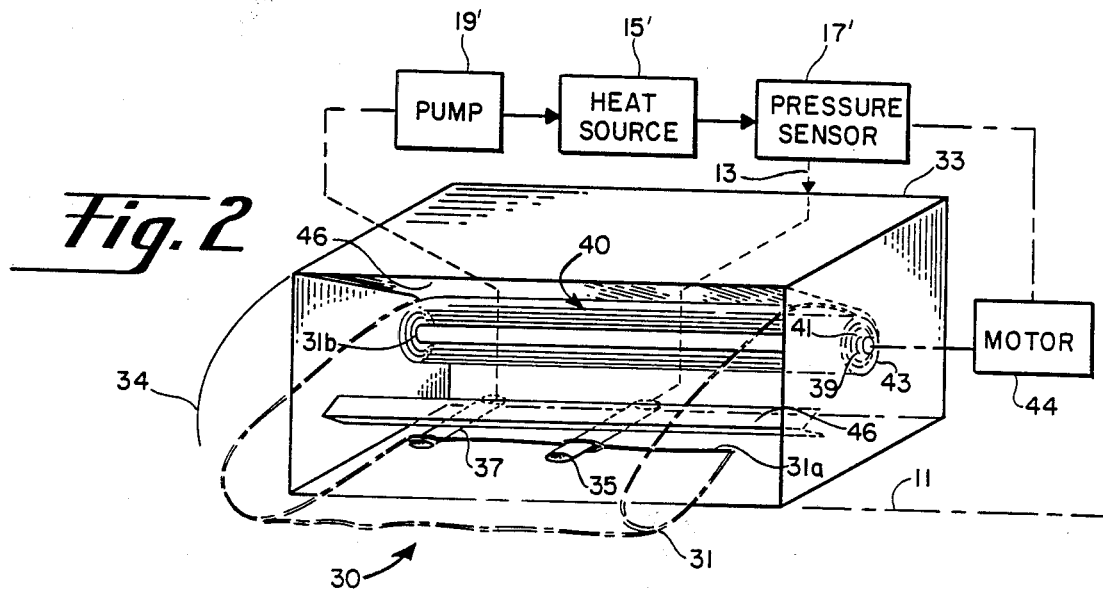
FIG. 2 shows a schematic perspective view of the extendable radiator system of the invention.

Referring now to FIG. 2, shown therein is a schematic view in perspective of the inflatable/collapsible and extendable radiator system 30 of the invention. System 30 includes one or more elongate, flexible and inflatable/deflatable sleeves 31 which may have any of several furlable expandable/collapsible structures described in the prior art including single or multiple chamber construction, the specific wall structure defining sleeve 31 of system 30 not being critical to the invention herein so long as a selected structure may be wound along the length thereof. Representative prior art sleeve structures are described relative to FIGS. 1 and 5 in U.S. Pat. No. 3,496,995, FIGS. 1 and 2 in U.S. Pat. No. 4,212,347 and FIGS. 2, 3 and 4 in U.S. Pat. No. 4,727,932. Further, sleeve 31 material may be selected depending on anticipated heat loads, design heat rejection capacity and selected heat exchange medium for vehicle 11 incorporating system 30. Sleeve 31 may therefore comprise substantially any light weight thin film material of elastomer, metal, composite reinforced elastomer or metal, prestressed metal foil, Kapton ®, Kevlar ®, plastic (e.g. polypropylene), rubber, metal/elastomer composite, fiber reinforced elastomer, or equivalent material of thickness typically from about 3 to about 300 mils. As with prior art structures referenced hereinabove, sleeve 31 may have substantially any overall length and may comprise a segmented, compartmentalized or self sealing wall structure for reducing significantly the probability of system failure and loss of heat exchange medium resulting from micrometeorid impact or hostile act, the structural details of which structure being outside the scope of these teachings.

Anticipated duty cycle temperatures for the heat rejection system incorporating the invention will dictate selection of heat exchange medium and corresponding sleeve structural material. For operating conditions at heat rejection temperatures in the range of about 300°–400° K., water, ammonia, methanol and freons may comprise the heat exchange medium. For heat rejection at high temperatures (e.g. 400°–1000 K.), liquid metals such as mercury, potassium, sodium and lithium and sodium-potassium eutectics may comprise the heat exchange medium.

Figure 3:
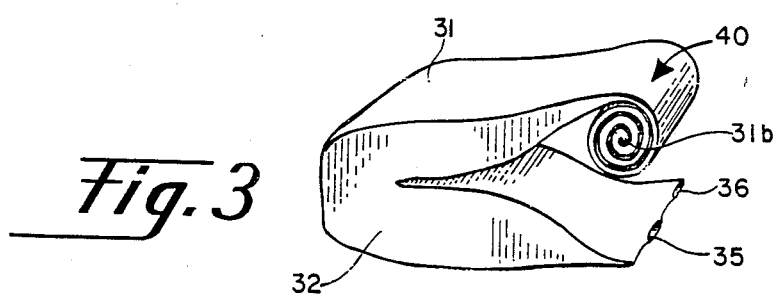
FIG. 3 schematically illustrates a portion of the sleeve of the FIG. 2 system in an inflated, partially extended condition.

System 30 is supported within a suitable housing 33 attached to or integral with vehicle 11, the housing optionally including a movable closure 34. One end 31a of sleeve 31 is attached to vehicle 11 at housing 33 with means defining at least one inlet 35 for admitting heated (vaporous) heat exchange medium 13 and with means defining at least one outlet 37 for conducting cooled (condensed) heat exchange medium 13 out of sleeve 31. Inlet 35 and outlet 37 may be operatively connected to pump 19', pressure sensing and control equipment 17' and source 15' substantially as illustrated for the FIG. 1 system in order to circulate heat exchange medium 13 into heat exchange relationship with source 15'. The closed other end 31b of sleeve 31 is attached to axle 39 of reel 40 rotatably supported within housing 33 as at rotatable mountings 41, preferably near end 31a of sleeve 31. Any unused (uninflated) portion of sleeve 31 is retained in a stored condition on reel 40 and unreeled as needed to provide a volume size presenting sufficient condensation surfaces 27 to accommodate momentary pressure of vaporous heat exchange medium 13 conducted into the interior of sleeve 31. Means in the form of spring 43 of motor 44 or a combination thereof, or other devices occurring to the skilled artisan guided by these teachings, are operatively attached to reel 40 to resiliently hold sleeve 31 in the stored condition and to retract sleeve 31 in response to pressure reduction therein during low heat rejection, low pressure portions of the duty cycle of system 30. In one non-limiting embodiment of the invention, motor 44 or other means for selectively retracting or extending sleeve 31 onto or from reel 40, may be controlled by means represented by pressure sensor 17' responsive to the pressure within system 30. One or more suitably placed guides 46 allow sleeve 31 to be inflated/unwound from and deflated/wound onto reel 40 without folding or binding. FIG. 3 illustrates schematically sleeve 31 partially inflated wherein a portion 32 thereof nearest inlet 35 is inflated in response to pressure within the system and the remainder of sleeve 31 nearest end 31b remains wound on reel 40.

The structure of the invention as just described allows sleeve 31 to extend only an amount required to accommodate momentary heat rejection requirements for vehicle 11 and, accordingly, the degree of sleeve 31 extension is minimized and restricted to that portion nearest inlet 35. Any fill tube 36 for sleeve 31 required to be included at inlet 35 need therefore not be extendable along the length of sleeve 31 as pressure is applied to the system, as is the case with certain prior art furlable systems. The observable cross section for micrometeoroid or hostile threats and maneuvering problems caused by extension of one or more radiator arms for vehicle 11 are therefore minimized.

The invention therefore provides a novel heat rejection system for a spacecraft or like vehicle. It is understood that structural materials, heat exchange medium, control equipment and size and operating temperature for the radiator may be selected according to specific mission requirements by one skilled in the applicable art guided by these teachings. All embodiments contemplated hereunder which achieve the objects of the invention have therefore not been shown in complete detail. Other embodiments may be developed without departing from the spirit of the invention or from the scope of the appended claims.

I claim:

1. A heat rejection system for radiating heat generated by a source of heat on a spacecraft or like vehicle, comprising:
   (a) a fluid heat exchange medium for contacting said source in operative circulating heat exchange relationship therewith, said medium comprising a fluid material for absorbing heat by conversion of said medium from a liquid phase of said medium to a vapor phase of said medium;
   (b) a flexible inflatable elongate sleeve of preselected length and coilable along said length between a first end and a second end thereof, said sleeve being closed at said first end defining an expandable and collapsible volume and having an inner condensation surface for condensing said vapor phase of said medium to said liquid phase of said medium and an outer heat radiating surface whereby heat is rejected from said sleeve;
   (c) means at said second end of said sleeve defining an inlet for conducting said vapor phase of said medium into said sleeve and an outlet for conducting liquid phase of said medium from said sleeve;
   (d) means for attachment to said vehicle and operatively attached to said first end of said sleeve for selectively winding and unwinding said sleeve generally along the length thereof in response to the pressure within said system;
   (e) means communicating with said sleeve through said inlet for conducting said medium in the vapor phase from said source to said volume;
   (f) means communicating with said outlet for conducting said liquid phase of said medium from said outlet into said heat exchange relationship with said source.

2. The system of claim 1 wherein said thin flexible film comprises material selected from the group consisting of elastomer, metal foil, composite reinforced elastomer, composite reinforced metal foil, prestressed metal foil, plastic, rubber, metal/elastomer composite, and fiber reinforced elastomer.

3. The system of claim 2 wherein said thin flexible film is from about 3 mils to about 300 mils in thickness.

4. The system of claim 1 wherein said heat exchange medium comprises a material selected from the group consisting of water, ammonia, methanol and freon.

5. The system of claim 1 wherein said heat exchange medium comprises a liquid metal.

6. The system of in claim 5 wherein said liquid metal is selected from the group consisting of mercury, potassium, sodium, lithium, and sodium-potassium eutectic.

* * * * *